US010427301B2

(12) United States Patent
Sugio

(10) Patent No.: US 10,427,301 B2
(45) Date of Patent: Oct. 1, 2019

(54) ROBOT SYSTEM AND ROBOT CONTROLLER

(71) Applicant: FANUC CORPORATION, Yamanashi (JP)

(72) Inventor: Kenji Sugio, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/048,341

(22) Filed: Jul. 30, 2018

(65) Prior Publication Data

US 2019/0047144 A1 Feb. 14, 2019

(30) Foreign Application Priority Data

Aug. 14, 2017 (JP) ................................ 2017-156526

(51) Int. Cl.
*B25J 9/16* (2006.01)
*B25J 9/00* (2006.01)
*B65G 1/127* (2006.01)
*B65G 17/12* (2006.01)
*G05B 19/418* (2006.01)

(52) U.S. Cl.
CPC ........... *B25J 9/1664* (2013.01); *B25J 9/0093* (2013.01); *B65G 1/127* (2013.01); *B65G 17/123* (2013.01); *G05B 19/4182* (2013.01); *G05B 2219/39102* (2013.01)

(58) Field of Classification Search
CPC ..... B25J 9/0093; B25J 9/1664; B65G 17/123; B65G 17/127
See application file for complete search history.

(56) References Cited

U.S. PATENT DOCUMENTS 5,407,264 A * 4/1995 Giegerich ............... G07F 11/58 198/799
9,120,623 B2 * 9/2015 Hanel .................... B65G 1/127
(Continued)

FOREIGN PATENT DOCUMENTS

| | | | | |
|---|---|---|---|---|
| EP | 1927427 A2 * | 6/2008 | ............ | B23P 19/001 |
| JP | S55-161718 A | 12/1980 | | |
| JP | 2002-192486 A | 7/2002 | | |

(Continued)

*Primary Examiner* — Thomas Randazzo
(74) *Attorney, Agent, or Firm* — Hauptman Ham, LLP

(57) ABSTRACT

A robot system and a robot controller, by which teaching operation, etc., for a robot can be easily carried out, with respect to a shelf having an unchangeable orientation. The robot controller has: a rotation angle obtaining section configured to obtain a rotation angle of a first rotation axis; a coordinate system calculating section configured to calculate a second coordinate system based on a first coordinate system; a position/orientation calculating section configured to calculate a position and orientation of the robot on a reference coordinate system, based on the rotation angle of the first rotation axis obtained by the rotation angle obtaining section and the teaching position on the second coordinate system; and a motion command generating section configured to generate a motion command for controlling a motion of the operation of the robot, based on the position and orientation of the robot calculated by the position/orientation calculating section.

4 Claims, 6 Drawing Sheets

(56) References Cited

U.S. PATENT DOCUMENTS

2004/0238326 A1* 12/2004 Lichti .................... B65G 1/127
198/475.1
2018/0086489 A1* 3/2018 Rogers .................... B25J 9/042

FOREIGN PATENT DOCUMENTS

JP 2003-44135 A 2/2003
JP 2017-1759 A 1/2017

* cited by examiner

12
ROBOT CONTROLLER
42
44
46
48
ROTATION ANGLE OBTAINING SECTION
COORDINATE SYSTEM CALCULATING SECTION
POSITION/ORIENTATION CALCULATING SECTION
MOTION COMMAND GENERATING SECTION
14
16
18
13
10
32
26
30
34
24
28
20
22

50
30
θ
10
36
10
50
30
36

10
50
38
30
θ
36
10
50
38
30
36

ROBOT SYSTEM AND ROBOT CONTROLLER

RELATED APPLICATIONS

The present application claims priority of Japanese Application Number 2017-156526, filed on Aug. 14, 2017, the disclosure of which is hereby incorporated by reference herein in its entirety.

BACKGROUND OF THE INVENTION

1. Field of the Invention

The present invention relates to a robot system and a robot controller.

2. Description of the Related Art

In the prior art, in a device having a shelf on which an article can be located, the shelf can be moved while the article is located thereon, so as to convey the article to a predetermined place. In such a device, the shelf may be configured to be moved while the orientation of the shelf may be always kept in the horizontal state, in order to prevent the article on the shelf from falling from the shelf (e.g., see JP S55-161718 A, JP 2017-001759 A, and JP 2003-044135 A).

On the other hand, it is a well-known technique to control a robot so that the robot can follow the movement of a workpiece on a conveyor and can perform a predetermined operation of the workpiece (e.g., see JP 2002-192486 A).

In the prior art, when a robot should be controlled so that the robot can follow a workpiece on a conveyor configured to move (or rotate) along a circular trajectory, the position and orientation of the robot at each time point is calculated based on a rotating coordinate system defined at a rotation center, and the robot is controlled based on the calculated position and orientation. However, when the robot must follow a shelf of the conveyor, the orientation of which is always kept constant (e.g., in the horizontal state) during the rotation of the conveyor, the shelf in the horizontal state is rotated relative to the robot, since the position and orientation of the robot are controlled based on the rotating coordinate system. Therefore, when the motion of the robot (e.g., aligning articles on the shelf) should be taught while taking the orientation of robot into consideration, the orientation of the robot must be taught while taking the action of the shelf into consideration. Such teaching may be burdensome and difficult.

SUMMARY OF THE INVENTION

One aspect of the present disclosure is a robot controller for a robot configured to perform an operation with respect to a conveying device having a rotating body rotatable about a first rotation axis, and at least one shelf configured to rotate about a second rotation axis parallel to the first rotation axis so that the shelf is kept in a constant orientation, the robot controller comprising: a rotation angle obtaining section configured to obtain a rotation angle of the first rotation axis; a coordinate system calculating section configured to, based on a first coordinate system having an origin on the first rotation axis and rotatable about the first rotation axis, calculate a second coordinate system and set the second coordinate system to the shelf, the second coordinate system having a constant orientation and three axes orthogonal to each other, one of which being parallel to the first rotation axis; a position/orientation calculating section configured to calculate a position and orientation of the robot on a reference coordinate system, based on the rotation angle of the first rotation axis obtained by the rotation angle obtaining section and the position of the robot on the second coordinate system; and a motion command generating section configured to generate a motion command for controlling a motion of the operation of the robot, based on the position and orientation of the robot calculated by the position/orientation calculating section.

Another aspect of the present disclosure is a robot system comprising: a robot configured to perform an operation with respect to a conveying device having a rotating body rotatable about a first rotation axis, and at least one shelf configured to rotate about a second rotation axis parallel to the first rotation axis so that the shelf is kept in a constant orientation; and a robot controller configured to control the robot, wherein the robot controller comprises: a rotation angle obtaining section configured to obtain a rotation angle of the first rotation axis; a coordinate system calculating section configured to, based on a first coordinate system having an origin on the first rotation axis and rotatable about the first rotation axis, calculate a second coordinate system and set the second coordinate system to the shelf, the second coordinate system having a constant orientation and three axes orthogonal to each other, one of which being parallel to the first rotation axis; a position/orientation calculating section configured to calculate a position and orientation of the robot on a reference coordinate system, based on the rotation angle of the first rotation axis obtained by the rotation angle obtaining section and the position of the robot on the second coordinate system; and a motion command generating section configured to generate a motion command for controlling a motion of the operation of the robot, based on the position and orientation of the robot calculated by the position/orientation calculating section.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
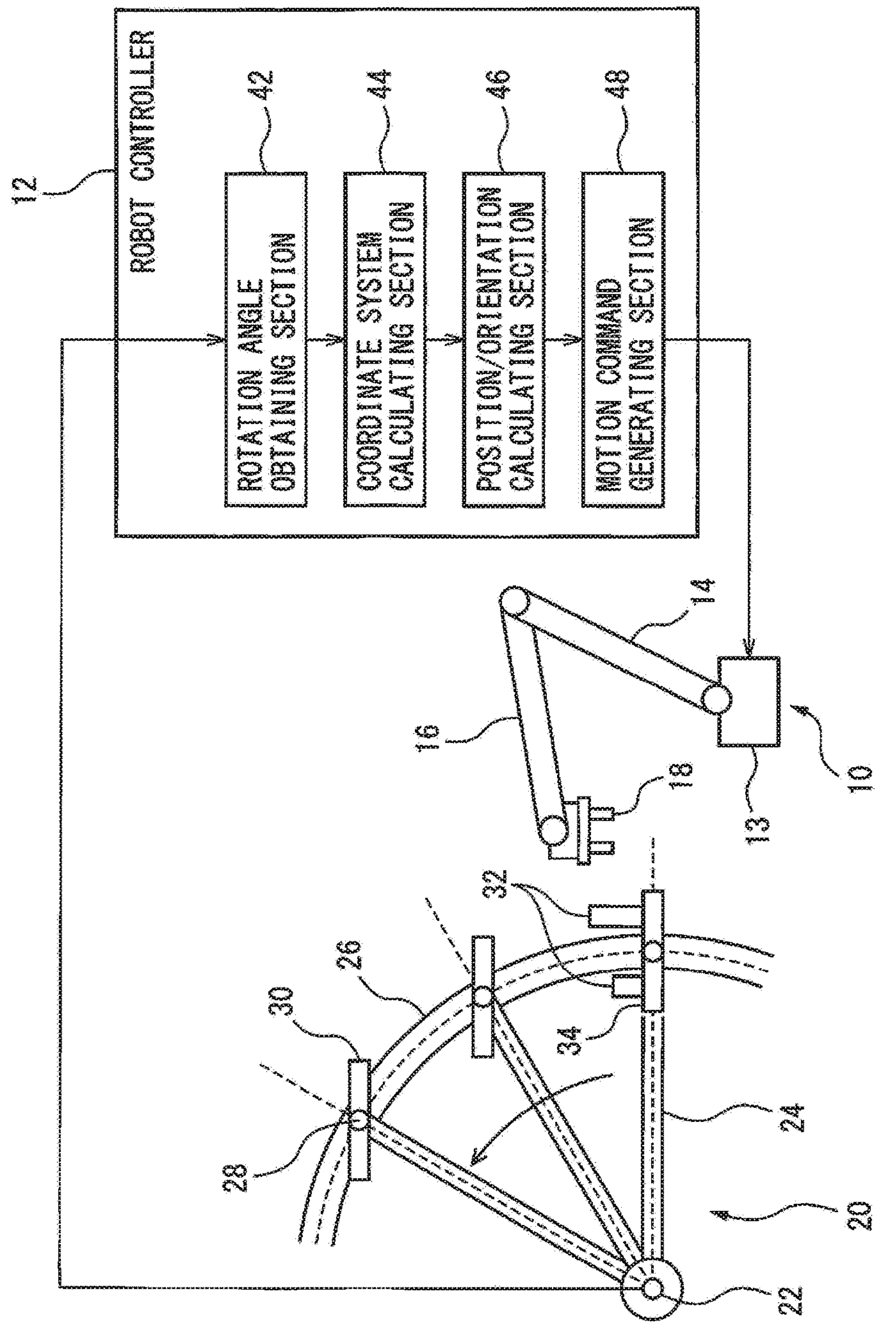
FIG. 1 is a view showing schematic configurations of a robot system and a conveying device according to a present disclosure.

FIG. 1 shows a schematic configuration of a robot system according to a preferred embodiment, including a robot (mechanical unit) 10 and a robot controller 12. Any type of robot can be used as robot 10, as long as the robot has a movable part such as a robot arm. For example, illustrated robot 10 is a vertical articulated robot having a base 13, an upper arm 14 rotatably attached to base 13, a forearm 16 rotatably attached to a front end of upper arm 14, and an end effector 18 rotatably attached to a front end of forearm 16. Robot 10 is configured to perform a predetermined operation with respect to (an article on a shelf of) a conveying device 20.

Conveying device 20 has a first rotation axis 22; a rotating body 24 configured to be rotated about first rotation axis 22 by using a driving part such as a servomotor; at least one (preferably, a plurality of) second rotation axis 28 arranged on an annular (or circumference) part 26 of rotating body 24, and parallel to first rotation axis 22; and the same number of rack(s) or shelf(s) 30 as second rotation axis (axes) 28, and configured to rotate about respective second rotation axes 28 so that each shelf is kept in a constant orientation during rotating body 24 is rotated. Rotating body 24 may be continuously rotated at a constant velocity, or may be intermittently rotated (e.g., rotating body 24 may be stopped for a given length of time, each time the rotating body has rotated by a predetermined angle).

Each shelf 30 is configured so that at least one article (workpiece) 32 such as a machine component or an industrial product, etc., can be located or mounted on the shelf. Further, each shelf is configured to be always kept in a constant orientation (i.e., the orientation or posture of the shelf is not changed). Unlike rotating body 24, it is not necessary to provide a motor for driving or rotating shelf 30. However, in order to positively keep the orientation of the shelf, a motor or a balancer may be provided to the shelf. In addition, shelf 30 has any structure as long as workpiece 32 can be located thereon, and thus shelf 30 may be a tray, a basket, a cage, or a box, etc. In the illustrated embodiment, both first rotation axis 22 and second rotation axis 28 are horizontal axes, and thus a mount surface 34 (on which workpiece 32 is located) of shelf 30 is always kept in the horizontal state. However, first rotation axis 22 and second rotation axis 28 are not limited to the horizontal axes, as long as they are parallel to each other.

Figure 2:
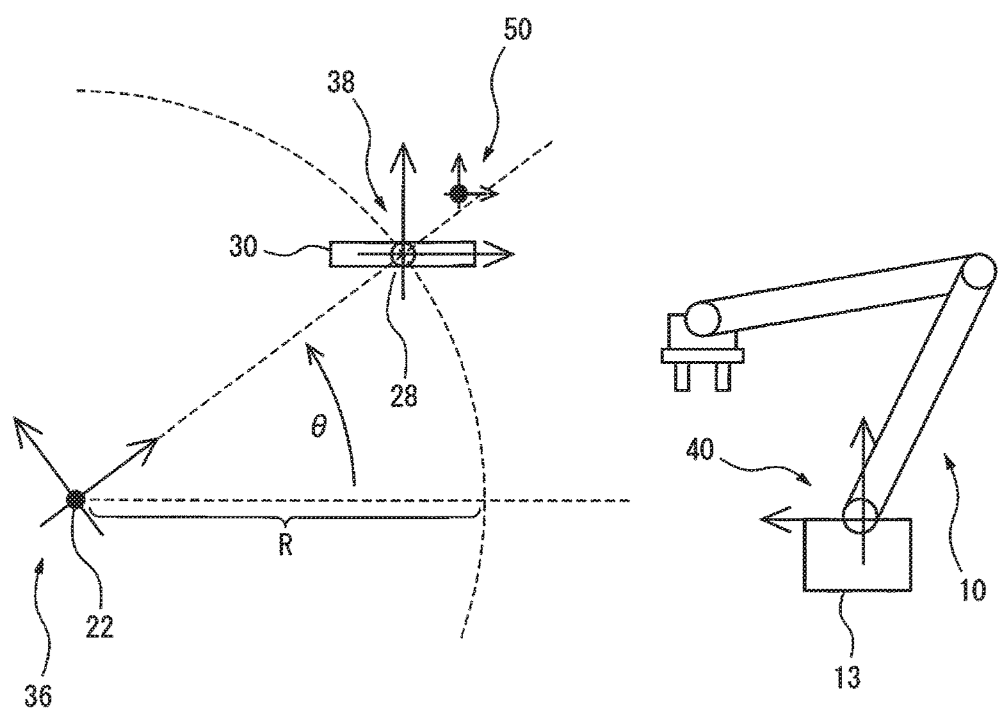
FIG. 2 is a view schematically showing a shelf of the conveying device and a robot.

FIG. 2 schematically shows conveying device 20, and shows a state in which three coordinate systems are defined, which are used in a process as explained below. Concretely, a first coordinate system 36 having an origin on first rotation axis 22 and rotatable about first rotation axis 22 is defined; a second coordinate system 38 is defined and set to shelf 30. Second coordinate system 30 has a constant orientation and three axes orthogonal to each other, one of which being parallel to first rotation axis 22. Further, a robot reference coordinate system 40 is defined and set to a predetermined part (e.g., base 13) of robot 10. Based on robot reference coordinate system 40, a motion command, etc., relating to the operation of robot 10, can be generated.

Referring to FIG. 1 again, robot controller 12 has: a rotation angle obtaining section 42 configured to obtain a rotation angle (rotational position) of first rotation axis 22; a coordinate system calculating section 44 configured to calculate second coordinate system 38 based on first coordinate system 36; a position/orientation calculating section 46 configured to calculate a position and orientation (or a motion trajectory) of robot 10 on reference coordinate system 40, based on the rotation angle of first rotation axis 22 obtained by rotation angle obtaining section 42 and the (teaching) position of the robot on second coordinate system 38; and a motion command generating section 48 configured to generate a motion command for controlling the motion of robot 10, based on the position and orientation of the robot calculated by position/orientation calculating section 46. For example, rotation angle obtaining section 42 may be configured to receive an output (signal) from an encoder connected to a motor (not shown) for driving first rotation axis 22, and calculate (or obtain) the rotation angle of first rotation axis 22. For example, components 42, 44, 46 and 48 of robot controller 12 may be configured as a memory or a processor, incorporated in robot controller 12.

Figure 3:
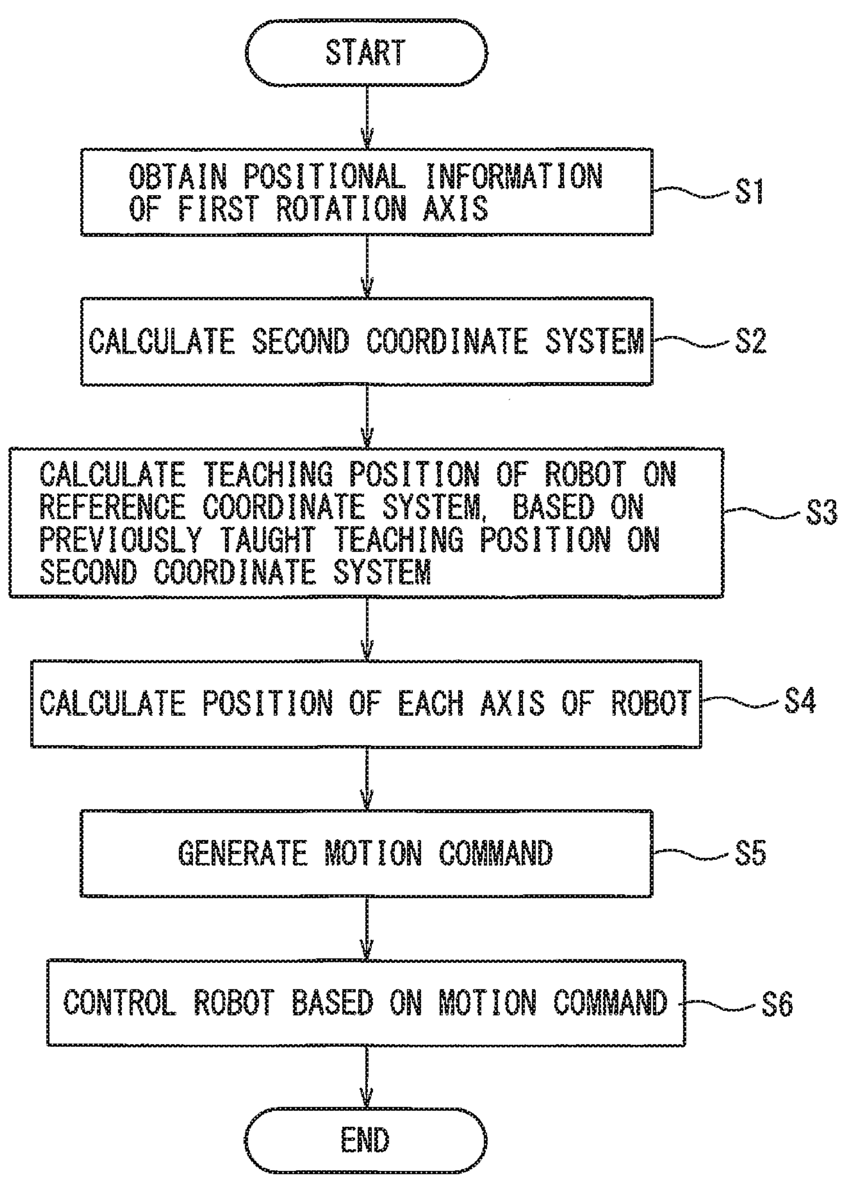
FIG. 3 is a flowchart showing an example of a procedure in the robot system.

Next, the motion of robot 10 and a procedure of robot controller 12 will be explained with reference to a flowchart of FIG. 3. In this example, outer circumference 26 of rotating body 24 of conveying device 20 has a circular shape, and second rotation axis 28 corresponding to the rotation center of each shelf 30 (i.e., the origin of second coordinate system 38) is positioned on an arc representing outer circumference 26. In this regard, the shape of the rotating body is not limited to the circle, for example, the rotating body may have an elliptic or track shape. In the embodiment, it is assumed that teaching of the operation of the robot with respect to (workpiece 32 on) shelf 30 (e.g., determining a teaching position and an orientation at the teaching of the robot relative to shelf 30) has previously carried out by the operator (user), by using a normal or conventional method.

First, positional information (e.g., a rotational position) of first rotation axis 22 is measured and obtained by rotation angle obtaining section 42 (step S1), and then second coordinate system 38 as shown in FIG. 2 is calculated and defined (step S2). The position of the origin of second coordinate system 38 (in this case, the origin is positioned on second rotation axis 28) can be calculated by a position of (the origin of) first coordinate system 36, an attachment position of shelf 30 relative to rotating body 2 (in this case, the attachment position can be calculated from a radius R of circumference 26), and a rotation angle θ of first rotation axis 22. In the embodiment, shelf 30 is configured to be always kept in a constant orientation (in this case, mount surface 34 is always kept in the horizontal state), and the orientation (posture) of second coordinate system 38 is constant without depending on the position of the origin thereof.

In the next step S3, by using a teaching position 50, which is previously taught on second coordinate system 38, a teaching position of robot 10 on reference coordinate system 40 is calculated. In this regard, the positional relationship between first coordinate system 36 and second coordinate system 38 has been calculated in step S2, and the positional relationship between first coordinate system 36 and reference coordinate system 40 can be calculated based on the position of first rotation axis 22 and the installation position of robot 10. Therefore, the teaching position and orientation on reference (orthogonal) coordinate system 40 can be calculated based on the teaching position and orientation on second coordinate system 38.

In the next step S4, by executing inverse transformation using the teaching position and orientation on reference coordinate system 40, the rotation angle of each axis of robot 10 is calculated. Next, in step S5, a motion command for robot 10 is generated based on the position of each axis for realizing the teaching position and orientation on robot reference coordinate system 40, and then robot 10 is controlled based on the generated motion command (step S6). The process of steps S1 to S6 may be repeated at predetermined (control) time intervals. Due to the above process, robot 10 can correctly perform the motion (or operation) with respect to (workpiece 32 on) shelf 30.

Figure 4:
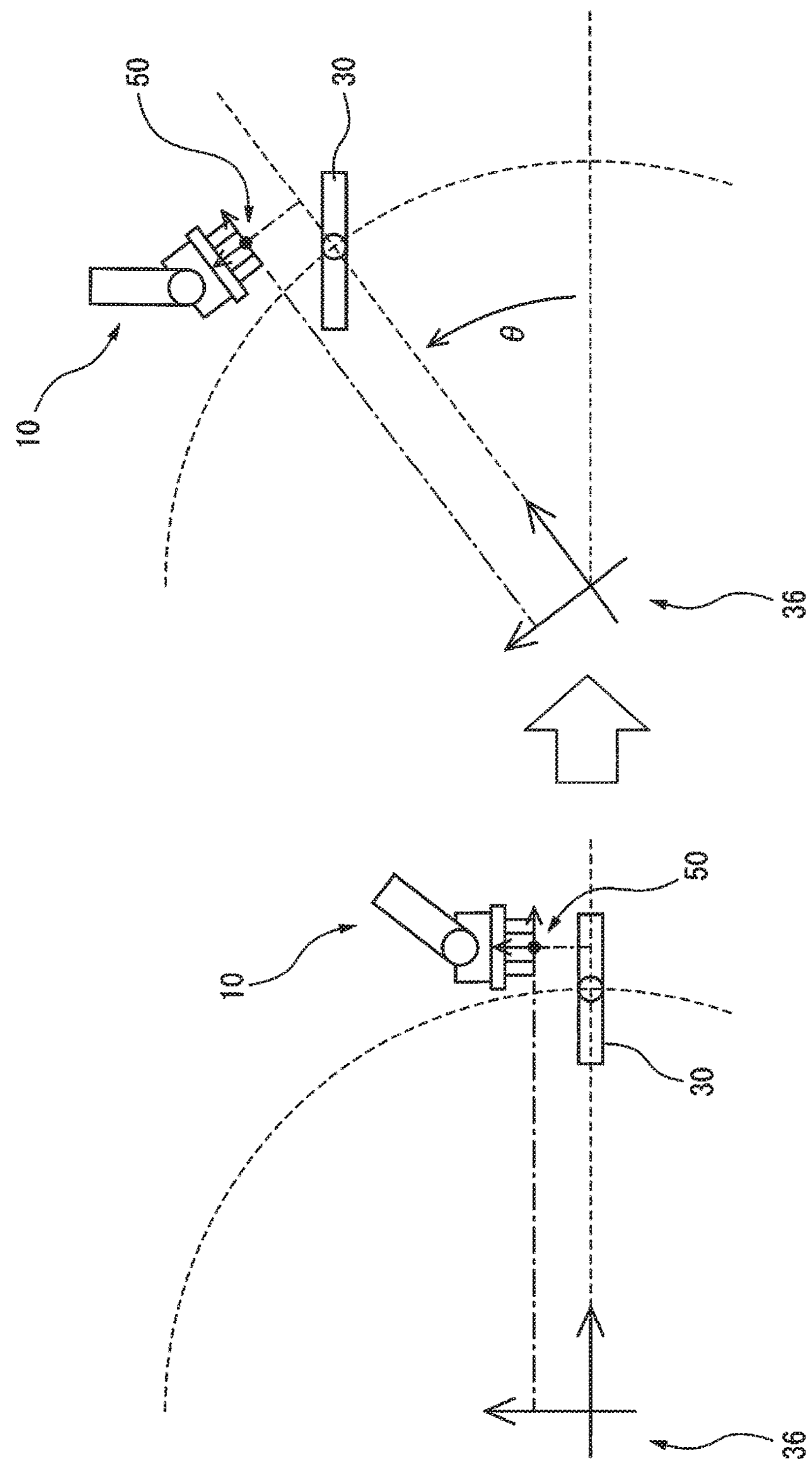
FIG. 4 is a view explaining an example of teaching operation for a robot in the prior art, as a comparative example.

FIG. 4 explains the setting of the teaching point according to the prior art, as a comparative example of the present disclosure. In the prior art, when the robot should follow shelf 30, etc., which is rotationally moved, the position and orientation of the robot relative to rotating first coordinate system 36 are controlled. Therefore, the orientation of the robot at a teaching point 50 is inclined by an angle which is the same as rotation angle θ of first coordinate system 36. On the other hand, the orientation of shelf 30 is always kept constant, and thus the rotation angle of shelf 30 relative to first coordinate system 36 must be considered in order to teach the motion for carrying out the operation with respect to the article on shelf 30, which is burdensome and difficult.

Figure 5:
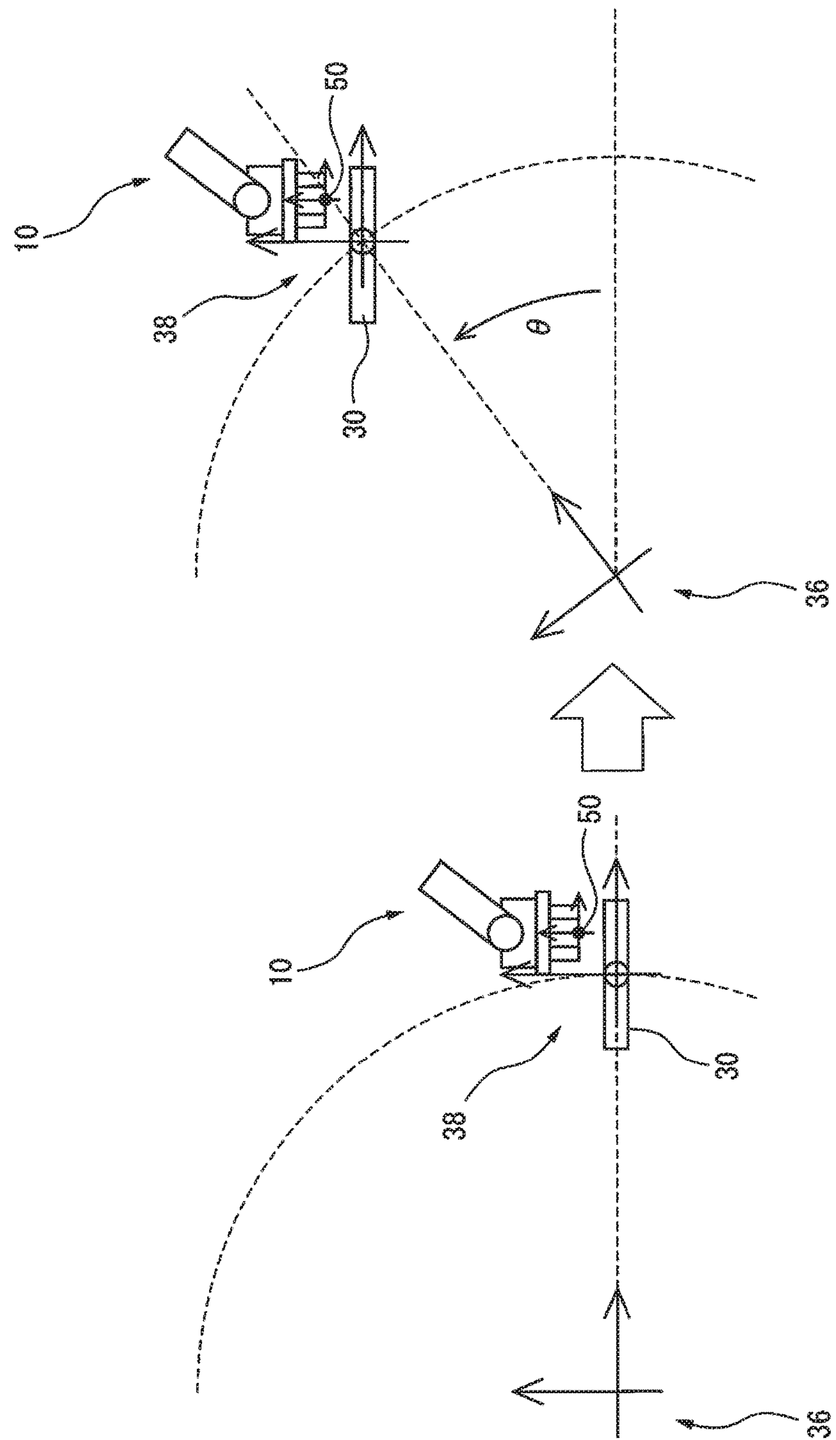
FIG. 5 is a view explaining an example of teaching operation for a robot according to the present disclosure.

To the contrary, as shown in FIG. 5, the robot system of the present disclosure uses second coordinate system 38 configured to be moved together with the representative position (e.g., the rotation center) of shelf 30 and to be kept in the constant orientation (in this case, the horizontal state) without depending on the rotation angle of first coordinate system 36 configured to be rotated relative to reference coordinate system 40 (i.e., the orientation of second coordinate system 38 is not changed in reference coordinate system 40). Further, the position and orientation of robot 10 are controlled based on second coordinate system 38. Therefore, the operator can easily teach the robot (hand), without considering the rotation angle of first coordinate system 36, at any position of shelf 30.

As in conveying device 20 including shelf 30 of the present disclosure, when the position or orientation of shelf 30 is changed relative to rotating body 24, the motion of robot 10 cannot properly follow shelf 30 by using only one coordinate system (in this case, first coordinate system 36). In view of the above, second coordinate system 38 is defined with respect to shelf 30, and the motion and/or the teaching of the robot is carried out on second coordinate system 38. In this regard, when shelf 30 (or second coordinate system 38) can be arbitrarily rotated, it is necessary to use an encoder, etc., in order to detect the rotational position of the shelf.

Therefore, based on the assumption that first rotation axis 22 and second rotation axis 28 are parallel to each other, and the orientation of shelf 30 is unchangeable, the amounts of rotation (or the absolute values of the rotation angles) of first coordinate system 36 and second coordinate system 38 are equal to each other. Accordingly in the preset disclosure, by simply setting second coordinate system 38 without using another device such as an encoder, etc., an amount of calculation of controller 12 can be significantly reduced.

Figure 6:
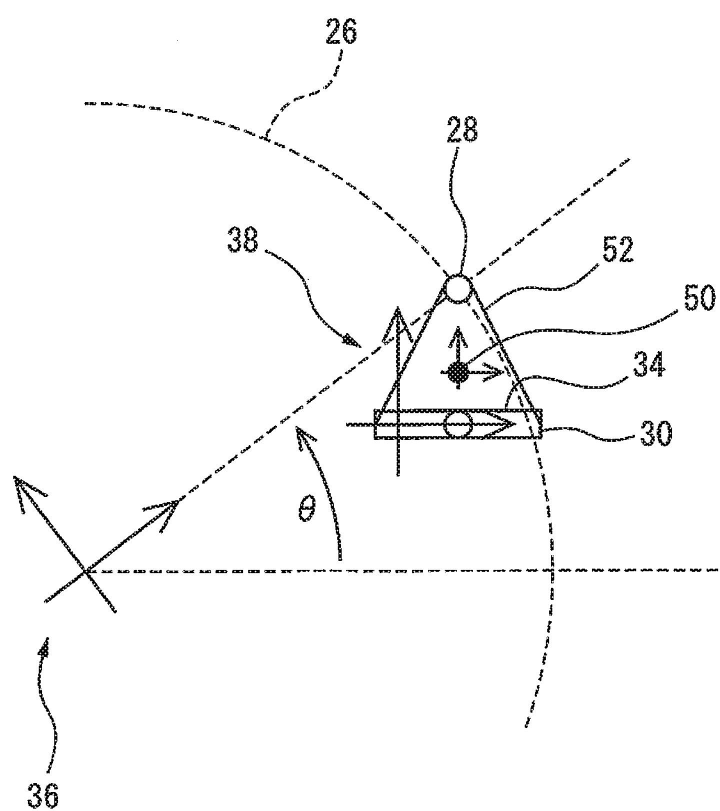
FIG. 6 is a view showing an example in which a second coordinate system is defined so that the second coordinate system is offset from a rotation center of the shelf.

FIG. 6 shows an example in which the origin of second coordinate system 38 is set at a position which is different from the example of FIG. 2. In FIG. 2, the origin of second coordinate system 38 is positioned on second rotation axis 28. On the other hand, as exemplified in FIG. 6, when shelf 30 is suspended from circumference part 26 of the rotating body by using a string-shaped article 52 such as a wire so that the rotation center of shelf 30 is not positioned in or on shelf 30, the origin of second coordinate system 38 can be separated (offset) from rotation center 28 of shelf 30. Concretely, second coordinate system 38 may be defined so that the origin of second coordinate system 38 is positioned on mount surface 34 of shelf 30. In such a case, the operator can carryout the teaching of robot 10 based on the position on shelf 30, and can easily check the position of teaching point 50.

In addition, second coordinate systems 8 may be previously set or defined with respect to all of the shelves, respectively. Otherwise, may be set with respect to only the shelf which is positioned within a motion range (or an operation area) of robot 10. When second coordinate systems 38 are set with respect to the plurality of shelves, respectively, the motion command generating section generates a motion command for controlling the robot so as to perform an operation which is simultaneously associated with the plurality of shelves. For example, due to the motion command, the robot can grip the workpiece on one shelf and move the gripped workpiece onto the other shelf.

According to the present disclosure, the motion command for the robot so as to perform the operation with respect to the shelf having the unchangeable orientation can be easily generated.

While the invention has been described with reference to specific embodiments, it will be understood, by those skilled in the art, that various changes or modifications may be made thereto without departing from the scope of the following claims.

The invention claimed is:

1. A robot controller for a robot configured to perform an operation with respect to a conveying device having a rotating body rotatable about a first rotation axis, and at least one shelf configured to rotate about a second rotation axis parallel to the first rotation axis so that the shelf is kept in a constant orientation, the robot controller comprising:

- a rotation angle obtaining section configured to obtain a rotation angle of the first rotation axis;
- a coordinate system calculating section configured to, based on a first coordinate system having an origin on the first rotation axis and rotatable about the first rotation axis, calculate a second coordinate system and set the second coordinate system to the shelf, the second coordinate system having a constant orientation and three axes orthogonal to each other, one of which being parallel to the first rotation axis;
- a position/orientation calculating section configured to calculate a position and orientation of the robot on a reference coordinate system, based on the rotation angle of the first rotation axis obtained by the rotation angle obtaining section and the position of the robot on the second coordinate system; and
- a motion command generating section configured to generate a motion command for controlling a motion of the operation of the robot, based on the position and orientation of the robot calculated by the position/orientation calculating section.

2. The robot controller as set forth in claim 1, wherein the coordinate system calculating section sets an origin of the second coordinate system to a position which is offset from a rotation center of the shelf.

3. The robot controller as set forth in claim 1, wherein the coordinate system calculating section sets the second coordinate system to each of a plurality of shelves, and the motion command generating section generates a motion command for controlling the robot so as to perform an operation which is simultaneously associated with the plurality of shelves.

4. A robot system comprising:

- a robot configured to perform an operation with respect to a conveying device having a rotating body rotatable about a first rotation axis, and at least one shelf configured to rotate about a second rotation axis parallel to the first rotation axis so that the shelf is kept in a constant orientation; and
- a robot controller configured to control the robot, wherein the robot controller comprises:

- a rotation angle obtaining section configured to obtain a rotation angle of the first rotation axis;
- a coordinate system calculating section configured to, based on a first coordinate system having an origin on the first rotation axis and rotatable about the first rotation axis, calculate a second coordinate system and set the second coordinate system to the shelf, the second coordinate system having a constant orientation and three axes orthogonal to each other, one of which being parallel to the first rotation axis;

a position/orientation calculating section configured to calculate a position and orientation of the robot on a reference coordinate system, based on the rotation angle of the first rotation axis obtained by the rotation angle obtaining section and the position of the robot on the second coordinate system; and a motion command generating section configured to generate a motion command for controlling a motion of the operation of the robot, based on the position and orientation of the robot calculated by the position/orientation calculating section.

* * * * *